US007530347B2

(12) United States Patent
Asano et al.

(10) Patent No.: US 7,530,347 B2
(45) Date of Patent: May 12, 2009

(54) AIR AMOUNT COMPUTING UNIT AND FUEL CONTROL UNIT OF INTERNAL COMBUSTION ENGINE

(75) Inventors: Seiji Asano, Hitachinaka (JP); Masahiro Sato, Hitachinaka (JP); Shigeru Nishita, Hitachinaka (JP); Kenichi Kotabe, Mito (JP); Kenji Mizushima, Hitachinaka (JP); Sadato Horiuchi, Hitachinaka (JP); Makoto Muto, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/942,834

(22) Filed: Nov. 20, 2007

(65) Prior Publication Data

US 2008/0120010 A1 May 22, 2008

(30) Foreign Application Priority Data

Nov. 22, 2006 (JP) ............................ 2006-314990

(51) Int. Cl.
*F02D 1/00* (2006.01)
*B60T 7/12* (2006.01)

(52) U.S. Cl. ........................ 123/434; 123/319; 701/103

(58) Field of Classification Search ................. 123/434, 123/435, 319, 321, 322, 345–348; 701/103, 701/104, 114, 115

See application file for complete search history.

(56) References Cited

U.S. PATENT DOCUMENTS 5,678,402 A * 10/1997 Kitagawa et al. .............. 60/276
6,178,956 B1 * 1/2001 Steinmann et al. ..... 123/568.21

(Continued)

FOREIGN PATENT DOCUMENTS

JP 9-158762 A 6/1997

(Continued)

*Primary Examiner*—John T Kwon
(74) *Attorney, Agent, or Firm*—Crowell & Moring LLP

(57) ABSTRACT

There is provided an air amount computing unit, and a fuel control unit, of an internal combustion engine that calculates a cylinder flow-in air amount during a transient state without response delay and so as not to have any inflection point in changes of flow rate and that allows a desirable air-fuel ratio to be kept. The air amount computing unit has air amount detecting means for detecting an air amount passing through an intake throttle section of the internal combustion engine, air amount computing means for obtaining a calculated value of the air amount passing through the intake throttle section from an throttle opening angle, means for obtaining an air amount flowing into a cylinder of the internal combustion engine by excluding an air amount filled into an intake manifold by filtering by a difference between a value of the air amount passing through the intake throttle section of this time and a previous filtering value, a first filter based on the air amount detected by the air amount detecting means, a second filter based on the calculated value of the air amount obtained by the air amount computing means, selecting means for selecting an input value and a previous output value of the first filter when the internal combustion engine is in a static state and selecting an input value and a previous output value of the second filter when the internal combustion engine is in a transient state and a third filter for inputting a selected value selected by said selecting means, wherein the output of the third filter is determined to be an air amount flowing into the cylinder.

12 Claims, 12 Drawing Sheets

U.S. PATENT DOCUMENTS

| | | | | |
|---|---|---|---|---|
| 2006/0037568 | A1* | 2/2006 | Arinaga et al. ........... | 123/90.15 |
| 2006/0249109 | A1* | 11/2006 | Ezaki et al. .............. | 123/90.16 |

FOREIGN PATENT DOCUMENTS

| | | | |
|---|---|---|---|
| JP | 2693884 | B2 | 9/1997 |
| JP | 2716596 | B2 | 11/1997 |
| JP | 2749226 | B2 | 2/1998 |
| JP | 2908924 | B2 | 4/1999 |

* cited by examiner

AIR AMOUNT COMPUTING UNIT AND FUEL CONTROL UNIT OF INTERNAL COMBUSTION ENGINE

BACKGROUND OF THE INVENTION

1. Field of the Invention

The present invention relates to an air amount computing unit and a fuel control unit of an internal combustion engine for vehicles such as automobiles and more specifically to the air amount computing unit for computing an air amount flowing into the cylinder of an internal combustion engine and to the fuel control unit for controlling a fuel injection amount by using the air amount flowing into the cylinder.

2. Background Art

As an engine control unit that calculates intake pipe pressure and a cylinder flow-in air amount on the basis of a throttle passing air amount, there is one that calculates the throttle passing air amount from an output of a throttle opening sensor, compares its temporal variation with a temporal variation of an intake air amount that is an output of an intake air amount sensor and corrects the throttle passing air amount inputted to the calculations of the cylinder flow-in air amount and of the intake pipe pressure on the basis of the comparison result to compensate a control delay as disclosed in JP Published Patent Application (Kokai) H9-158762 (1997) for example.

According to this engine control unit, when the engine is in a transient state, a filtering system that has the intake manifold pressure as an internal state variable is arranged to input a value in which a temporal variation of the intake air amount calculated based on the throttle opening is added to the intake air amount detected by the intake air amount sensor.

The calculation of the cylinder flow-in air amount in the prior art engine control unit is carried out by adding the temporal variation of the intake air amount calculated from the throttle opening angle to the intake air amount of only the input to the filter detected by the sensor and the intake air amount calculated from the throttle opening angle is not related to a previous filter output value inputted to the filter, so that an inflection point may occur in the next output and a desired air-fuel ratio may not be obtained as a result.

The present invention has been made in view of the problems to be solved and its purpose is to provide an air amount computing unit, and a fuel control unit, of an internal combustion engine that calculates the cylinder flow-in air amount during a transient state without a response delay and so as not to have any inflection point in changes of flow rate and that allows a desirable air-fuel ratio to be kept.

SUMMARY OF THE INVENTION

In order to achieve the aforementioned object, an air amount computing unit of an internal combustion engine of the invention has air amount detecting means for detecting an air amount passing through an intake throttle section of the internal combustion engine, air amount computing means for obtaining a calculated value of the air amount passing through the intake throttle section from an throttle opening angle, means for obtaining an air amount flowing into a cylinder of the internal combustion engine by excluding an air amount filled into an intake manifold by filtering by a difference between a value of the air amount passing through the intake throttle section of this time and a previous filtering value, a first filter based on the air amount detected by the air amount detecting means, a second filter based on the calculated value of the air amount obtained by the air amount computing means, selecting means for selecting an input value and a previous output value of the first filter when the internal combustion engine is in a regular time and selecting an input value and a previous output value of the second filter when the internal combustion engine is in a transient state and a third filter for inputting a selected value selected by said selecting means, wherein the output of the third filter is determined to be an air amount flowing into the cylinder.

Furthermore, in order to achieve the aforementioned object, an air amount computing unit of an internal combustion engine has air amount detecting means for detecting an air amount passing through an intake throttle section of the internal combustion engine, throttle passing air amount computing means for calculating an air amount passing through the intake throttle from a throttle opening angle, driving state judging means for judging whether the internal combustion engine is in the transient state or in the regular time and cylinder flow-in air amount computing means for computing an air amount flowing into a cylinder by using the air amount measured by the air amount detecting means when the driving state judging means judges that the internal combustion engine is in the regular time and for computing the air amount flowing into the cylinder by using the air amount calculated by the throttle passing air amount computing means when the driving state judging means judges that the internal combustion engine is in the transient state.

Still more, in order to achieve the aforementioned object, the fuel control unit of the internal combustion engine of the invention controls a fuel injection amount by using the cylinder flow-in air amount computed by the air amount computing unit of the internal combustion engine of the invention described above.

According to the air amount computing unit of the internal combustion engine of the invention, the respective filters calculate an estimated value of intake pipe pressure based on the intake air amount measured by the air amount detecting means and on the throttle opening in parallel through internal state variables, so that the respective output behaviors become analogous due to a filtering property of the filters. Therefore, at the time of switching between transient and static states, the out put becomes to be linked smoothly without having any inflection point, causing no fluctuation of the air-fuel ratio.

DETAILED DESCRIPTION OF THE INVENTION

Embodiments of an air amount computing unit of an internal combustion engine of the invention will be explained with reference to the drawings.

Figure 1:
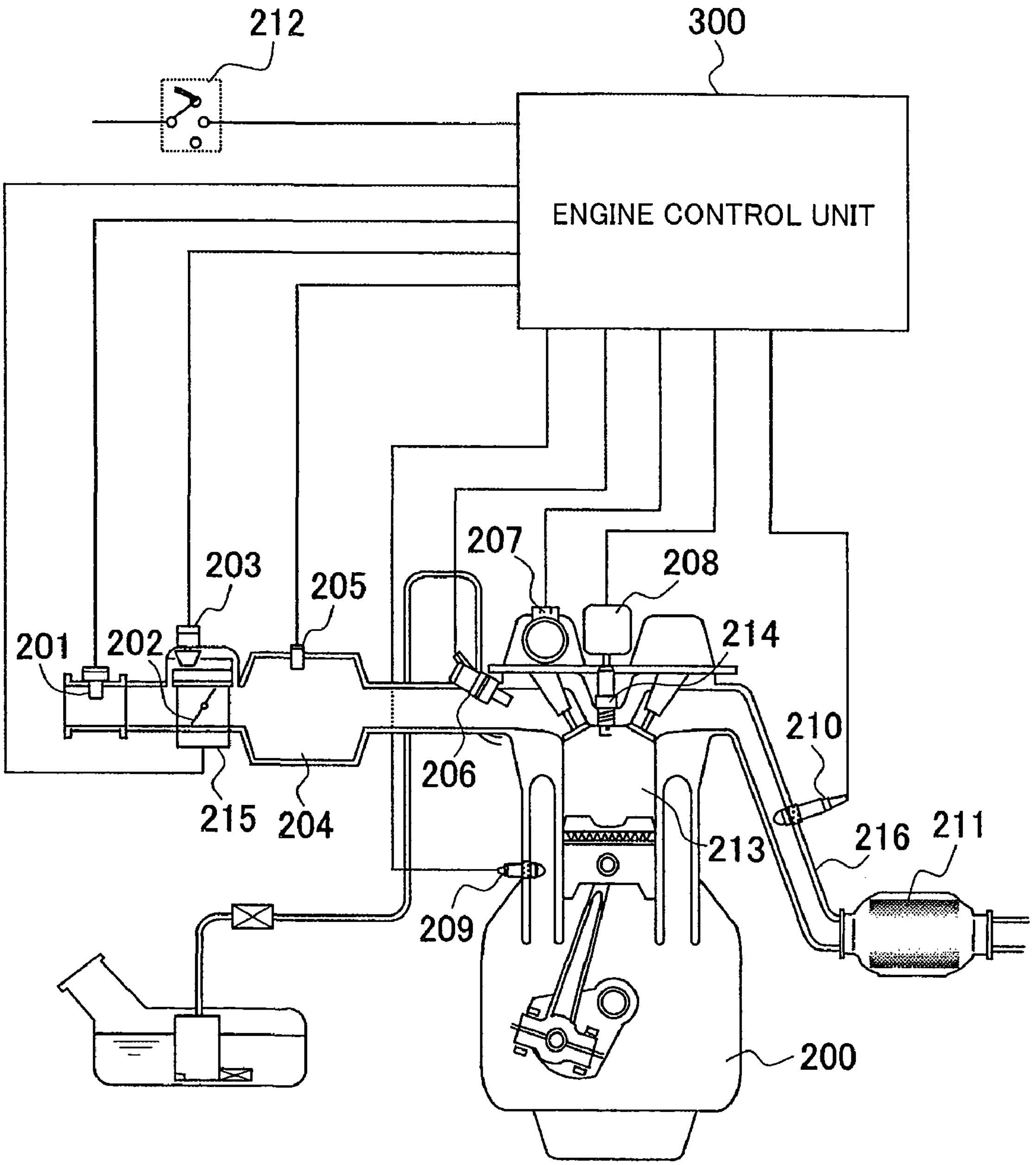
FIG. 1 is a structural diagram showing one embodiment of an internal combustion engine (engine) to which an air amount computing unit of the invention is applied.

FIG. 1 shows one embodiment of an internal combustion engine (engine) to which the air amount computing unit of the invention is applied.

The engine 200 has, in its intake system, a thermal intake air amount sensor (H/W sensor) 201, a throttle valve 202, a throttle opening sensor 215 for measuring an opening angle (throttle opening angle: TVO) of the throttle valve 202, an idle speed control valve (ISC valve) 203 for controlling a number of revolutions of the engine 200 during idling by controlling an area of a passage connected to an intake pipe 204 by bypassing the throttle valve 202, an intake air temperature sensor 205 for measuring temperature of intake air (intake air temperature THV) within the intake pipe 204 and a fuel injection valve 206 for injecting fuel required by the engine 200. The fuel injection valve 206 is provided per each cylinder.

The H/W sensor 201 is air amount detecting means and measures an air amount passing through the intake throttle section (the throttle valve 202). The throttle valve 202 manipulated by a driver adjusts a throttle opening angle and measures (limits) an air amount to be taken in.

The engine 200 is also provided with an ignition plug 214 for igniting mixed air of air and fuel supplied into a cylinder (combustion chamber) 213 and an ignition coil (ignition module) 208 for supplying igniting energy on the basis of an ignition signal outputted from an engine control unit 300. The ignition plug 214 is provided per each cylinder.

The engine 200 is also provided with a crank angle sensor 207 for detecting a crank angle and a water temperature sensor 209 for detecting temperature of cooling water.

A catalyst 211 is connected to an exhaust pipe 216. An oxygen density sensor 210 for measuring density of oxygen within exhaust gas is attached on an upstream side of the catalyst 211 in terms of a flow rate of the exhausted gas.

An ignition switch 212, a main switch, operates or stops the engine 200. The engine control unit 300 controls fuel including control of air-fuel ratio, ignition timing, idling and others.

Although the idling speed control valve 203 controls a number of idling speed of the engine 200 in the present embodiment, the throttle valve 202 can control the idling speed and the idling speed control valve 203 becomes unnecessary when the engine is arranged so that the throttle valve 202 is controlled by a motor or the like.

Figure 2:
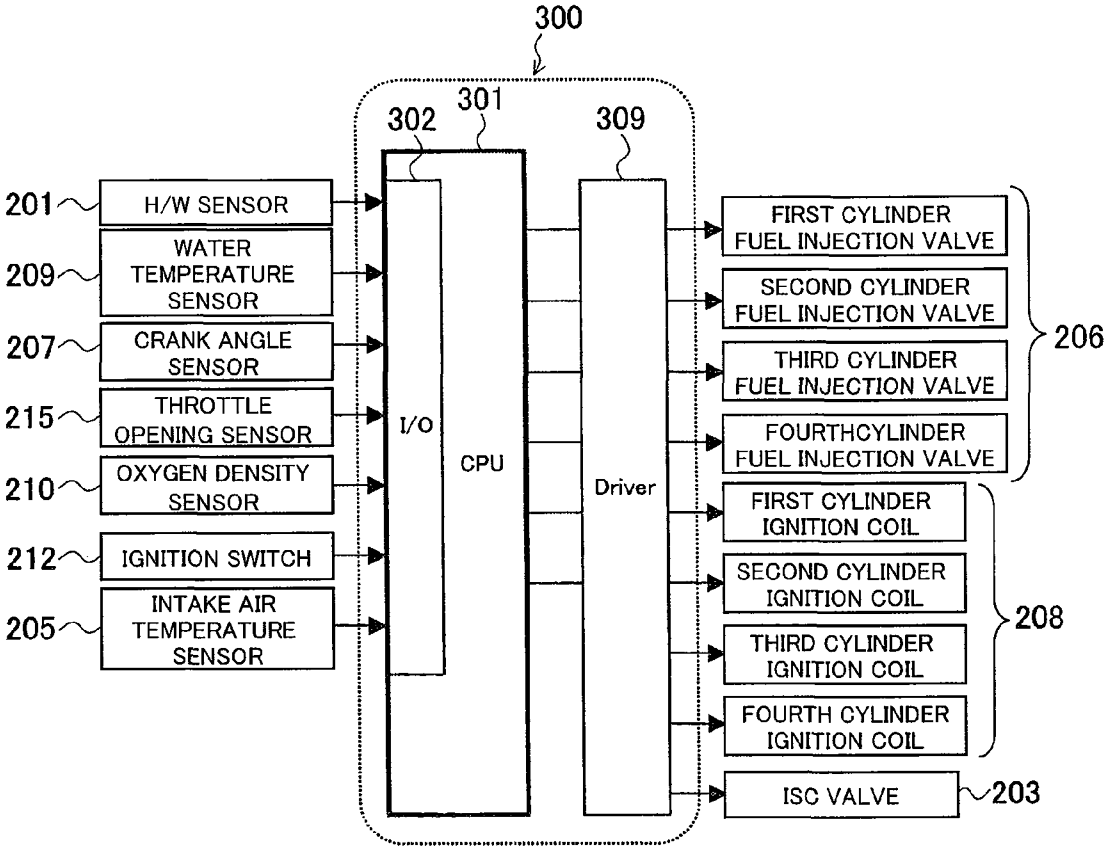
FIG. 2 is a block diagram showing one exemplary internal structure of an engine control unit.

As shown in FIG. 2, the engine control unit 300 is one electronically controlled by a microcomputer and has a CPU 301. The CPU 301 is provided with an I/O section 302 for converting electrical signals of the respective sensors provided in the engine 200 into digital computing signals and for converting digitally computed control signals into signals for driving actual actuators. The I/O section 302 receives the electrical signals respectively from the H/W sensor 201, the water temperature sensor 209, the crank angle sensor 207, the throttle opening sensor 215, the oxygen density sensor 210, the ignition switch 212 and the intake air temperature sensor 205. The CPU 301 outputs output signals to the fuel injection valve 206, the ignition coil 208 and the ISC valve 203 via an output driver 309.

Figure 3:
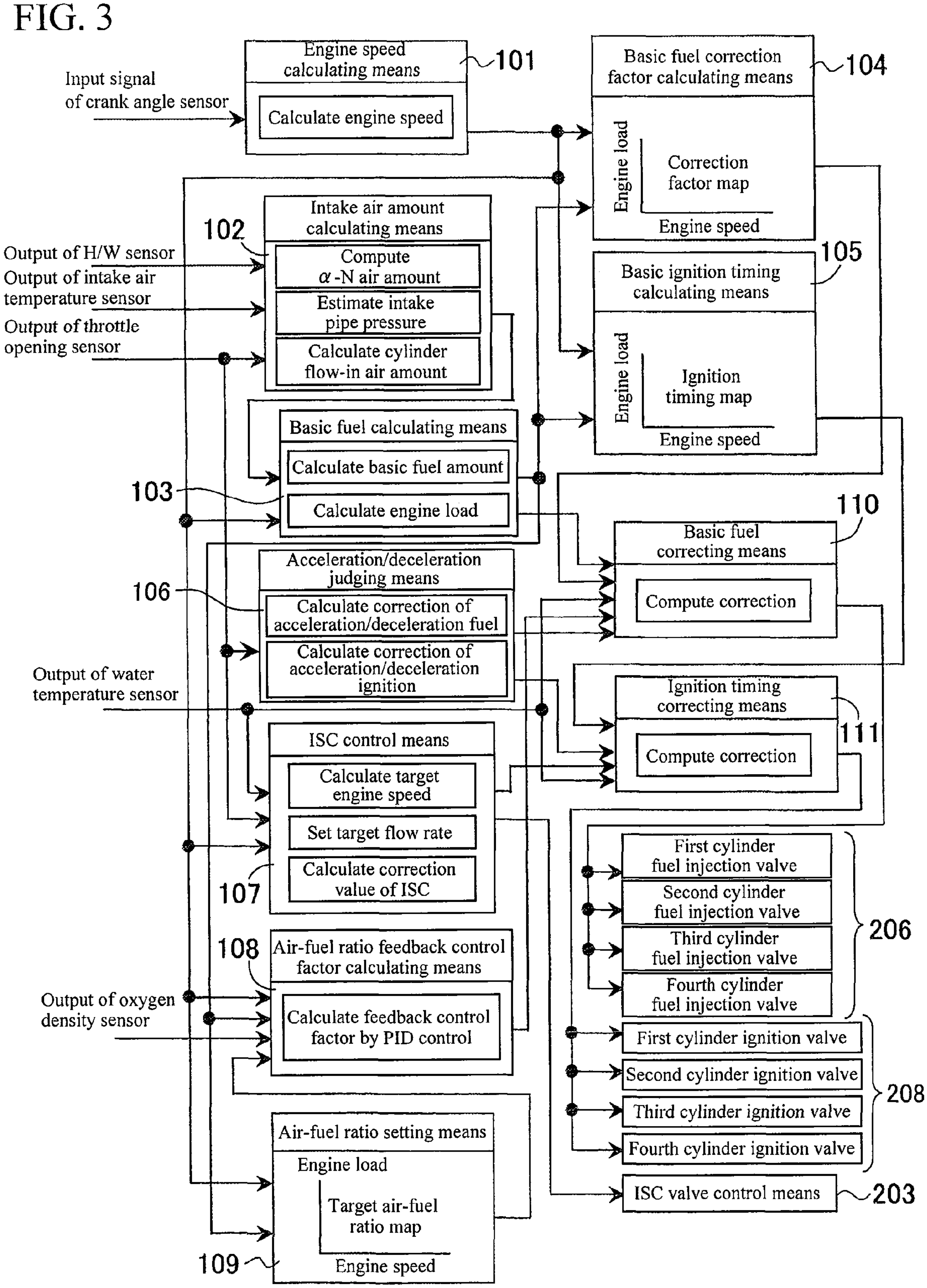
FIG. 3 is a block diagram showing one embodiment of a control block of the engine control unit that functions as the air amount computing unit of the invention.

Next, one embodiment of a control block of the engine control unit 300 functioning as the air amount computing unit of the invention will be explained with reference to FIG. 3.

By executing computer programs, the engine control unit 300 realizes, in terms of software, engine speed calculating means 101, intake air amount calculating means 102, basic fuel calculating means 103, basic fuel correction factor calculating means 104, basic ignition timing calculating means 105, acceleration/deceleration judging means 106, ISC control means 107, air-fuel ratio feedback control factor calculating means 108, target air-fuel ratio setting means 109, basic fuel correcting means 110 and ignition timing correcting means 111.

The engine speed calculating means 101 calculates speed of the engine 200 (engine speed Ne) per unit time by counting electrical signals or mainly a number of inputs of changes of pulse signals per unit time, of the crank angle sensor 207 set at predetermined crank angle position of the engine 200 and by arithmetically processing it.

The intake air amount calculating means 102 computes an α-N air amount and the intake pipe pressure estimated value on the basis of the outputs of the H/W sensor, the intake air temperature sensor and the throttle sensor and computes a cylinder flow-in air amount flowing into the cylinder 213 of the engine 200 by using them.

The basic fuel calculating means 103 calculates a basic fuel amount and an engine load required by the engine in each range from the engine speed computed by the engine speed calculating means 101 and the cylinder flow-in air amount computed by the intake air amount calculating means 102.

The basic fuel correction factor calculating means 104 calculates a correction factor of the basic fuel calculated by the intake air amount calculating means 102 in each driving range of the engine 200 from the engine speed computed by the engine speed calculating means 101 and the engine load computed by the basic fuel calculating means 103.

The basic ignition timing calculating means 105 decides optimum ignition timing (basic ignition timing) of the engine 200 corresponding to the engine speed and the engine load by retrieving a map.

The acceleration/deceleration judging means 106 processes the electrical signal outputted from the throttle opening sensor 215 to judge whether the engine 200 is in a state of acceleration or deceleration (judge if transient) and calculates an acceleration/deceleration fuel correction amount and an acceleration/deceleration ignition timing correction value in accordance to the judgment if the engine is in the transient state.

The ISC control means 107 sets a target engine speed during idling to keep the idling speed of the engine 200 at a predetermined value and computes a target flow rate and a correction value of ISC ignition timing.

The ISC control means 107 outputs an ISC valve signal from the target flow rate to the ISC valve 203. Thereby, the ISC valve 203 is driven so that the target flow rate is maintained during idling.

The air-fuel ratio feedback control factor calculating means 108 calculates an air-fuel ratio feedback control factor from an output of the oxygen density sensor 210 so that mixed air of fuel and air supplied to the engine 200 is kept at a target air-fuel ratio described later by PID control.

It is noted that although the oxygen density sensor 210 that outputs a signal proportional to an exhaust air-fuel ratio is shown in the present embodiment, ones that output two signals of rich side/lean side of exhaust gas with respect to a theoretical air-fuel ratio may be also used.

The target air-fuel ratio setting means 109 decides the optimum target air-fuel ratio in each range of the engine from the engine speed and the engine load by retrieving a map and others. The target air-fuel ratio decided by the target air-fuel ratio setting means 109 is used for the calculation of the air-fuel ratio feedback control factor performed by the air-fuel ratio feedback control factor calculating means 108.

The basic fuel correcting means 110 corrects the basic fuel amount computed by the basic fuel calculating means 103 by the basic fuel correction factor calculated by the basic fuel correction factor calculating means 104, the acceleration/deceleration fuel correction amount calculated by the acceleration/deceleration judging means 106 and the air-fuel ratio feedback control factor calculated by the air-fuel ratio feedback control factor calculating means 108. The basic fuel correcting means 110 also corrects the fuel amount in accordance to an output of the water temperature sensor.

The basic fuel correcting means 110 outputs a fuel injection command signal of the corrected fuel amount to the fuel injection valve 206 of each cylinder. Thereby, the fuel injection valve 206 injects and supplies fuel of the certain fuel amount to each cylinder.

The ignition timing correcting means 111 corrects the basic ignition timing computed by the basic ignition timing calculating means 105 by the acceleration/deceleration ignition timing correction value calculated by the acceleration/deceleration judging means 106 and the ISC ignition timing correction value calculated by the ISC control means 107. The ignition timing correcting means 111 also corrects the ignition timing corresponding to the output of the water temperature sensor.

The ignition timing correcting means 111 outputs a corrected ignition timing command signal to the ignition coil 208 of each cylinder. Thereby, the ignition plug 214 of each cylinder sparks in accordance to the certain ignition timing to ignite the mixed air flown into the cylinder 213.

A control block of a basic part of one embodiment of the air amount computing unit of the invention will be explained with reference to FIG. 4. The air amount computing unit has intake pipe pressure estimating means 405 and cylinder flow-in air amount computing means 406.

Output voltage outputted from the H/W sensor 201 is filtered by a hard filter 402 and is soft-filtered by a soft filter 403.

The output voltage value of the air flow rate on which the filtering has been implemented is converted into an air flow rate (H/W sensor measured air flow rate) QA00 corresponding to the voltage by converting means 404 by retrieving a table. The H/W sensor measured air flow rate QA00 is inputted to the intake pipe pressure estimating means 405.

The intake pipe pressure estimating means 405 finds what a difference between an air amount flowing into the intake pipe 204 (H/W sensor measured air flow rate QA00) and an air amount flowing out of the intake pipe 204 (cylinder flow-in air amount QAR) is multiplied with a theoretical factor as pressure variation within the intake pipe dPMMHG/dt. The computation of this pressure variation dPMMHG/dt is carried out by the following equation (1):

[Equation 1]

$$\frac{dPMMHG}{dt} = \frac{R \cdot THA}{KIMV} \cdot (QA00 - QAR) \tag{1}$$

where, QAR: cylinder flow-in air amount

QA00: H/W sensor measured air flow rate

R: gas constant

KIMV: capacity of intake manifold (capacity within intake pipe)

THA: intake air temperature

Because this computation is that of a microcomputer, Z-conversion is implemented to Equation (1) as for a continuous value as calculation period ΔT by the following equation (2) to compute the intake pipe pressure estimated value PMMHG:

[Equation 2]

$$PMMHG(n) = \frac{R \cdot THA}{KIMV} \cdot \Delta T \cdot (QA00 - QAR) + PMMHG(n-1) \tag{2}$$

where, QAR: cylinder flow-in air amount

QA00: H/W sensor measured air flow rate

R: gas constant

KIMV: capacity of intake manifold (capacity within intake pipe)

THA: intake air temperature

The cylinder flow-in air amount QAR is computed by the cylinder flow-in air amount computing means 406. The cylinder flow-in air amount computing means 406 finds the cylinder flow-in air amount QAR by the following equation (3):

[Equation 3]

$$QAR = \frac{PMMHG \cdot KSV \cdot \frac{Ne}{2}}{R \cdot THA} \cdot \eta \tag{3}$$

where, PMMHG: intake pipe pressure estimated value

KSV: capacity of cylinder

Ne: engine speed

THA: intake air temperature

R: gas constant

η: charging efficiency

The engine speed Ne is an output value of the engine speed calculating means 101 and the intake air temperature THA is a value of temperature of intake air measured by the intake air temperature sensor 205.

Figure 4:
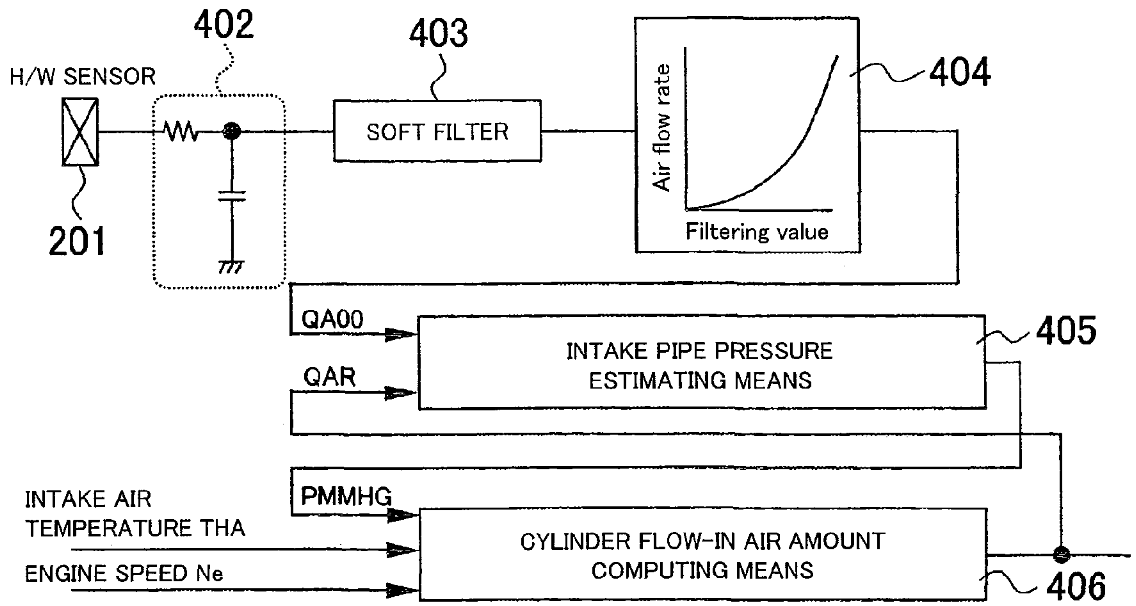
FIG. 4 is a block diagram showing the control block of a basic part according to one embodiment of the air amount computing unit of the internal combustion engine of the invention.
Figure 5:
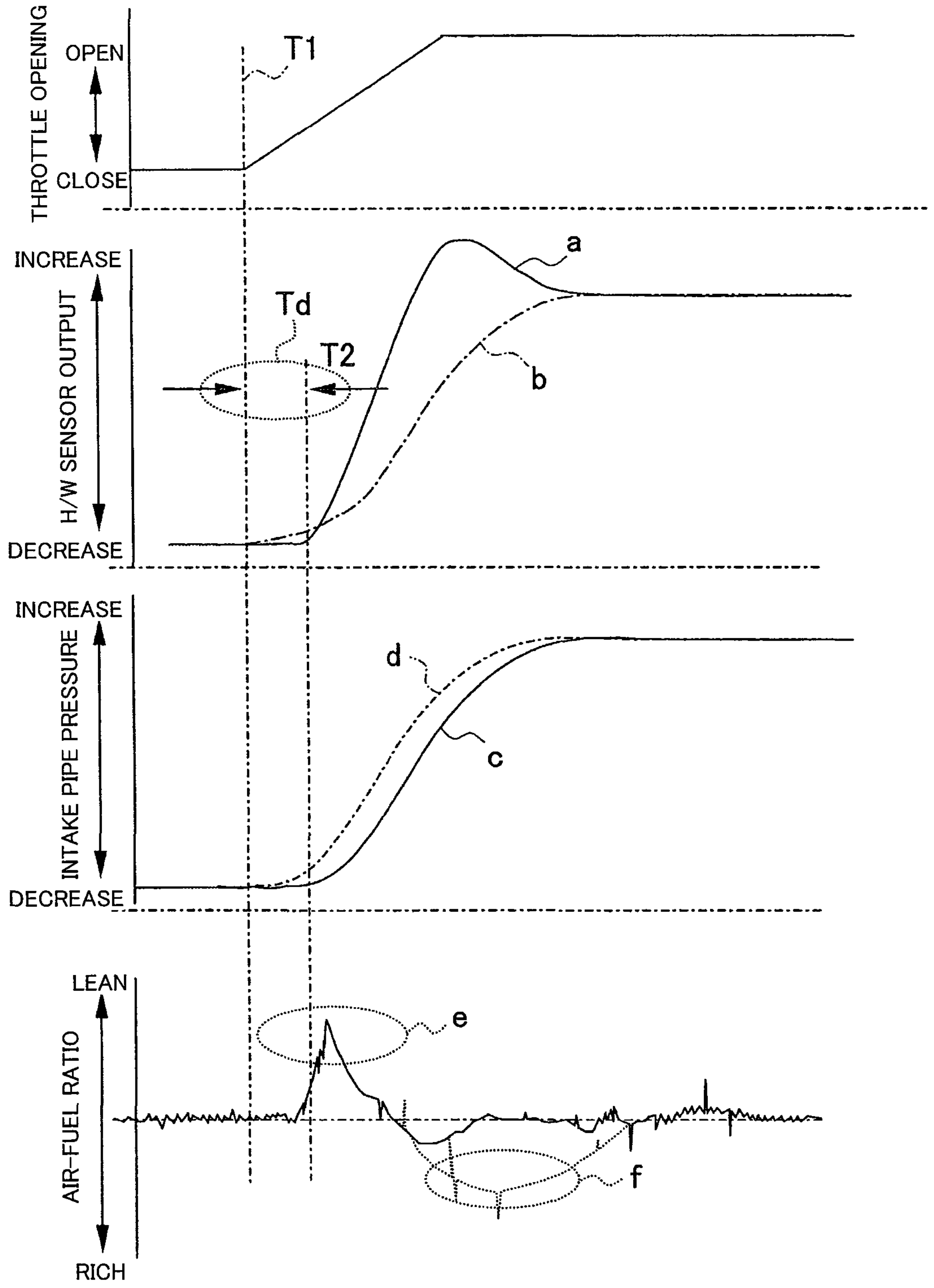
FIG. 5 is a time chart showing one exemplary fluctuating behavior of throttle opening angle, H/W sensor output, intake pipe pressure estimated value and exhaust air-fuel ratio at the basic part.

FIG. 5 shows one exemplary fluctuating behavior of the throttle opening angle, H/W sensor output, intake pipe pressure estimated value and exhaust air-fuel ratio according to the basic part of control as shown in FIG. 4. The throttle opening angle increases from time T1 and is put into an acceleration state. In connection with this, the output of the H/W sensor 201 (H/W sensor measured air flow rate QA00) rises from time T2 after an elapse of a delay time Td containing a response delay of sensors, filtering and a control delay as indicated by a line a and is late from actual one indicated by a line b.

The intake pipe pressure estimated value (PMMHG) calculated from the output of the H/W sensor 201 (H/W sensor measured air flow rate QA00) indicated by the line a turns out as indicated by a line c and is late from the actual intake pipe pressure d. Accordingly, the air-fuel ratio becomes lean at an area e due to the delay of rise of the intake pipe pressure estimated value (PMMHG).

Furthermore, when the fuel amount is calculated by the output of the H/W sensor, the air-fuel ratio becomes rich in a latter period of the transient time as indicated by an area f because an air amount filled in the intake pipe 204 is also measured.

Equation (4) is an expression for calculating a throttle passing air flow rate QATVO from a throttle opening area AA determined by the throttle opening angle of the throttle valve 202. Although the throttle passing air flow rate QATVO may be found by the following equation (4), it contains exponents and the like and it is not a general practice to compute it by the microcomputer.

[Equation 4]

$$QATVO = AA \cdot \frac{1}{\sqrt{R \cdot THA}} \cdot PATM \cdot \sqrt{\frac{2 \cdot k}{k-1} \cdot \left\{ \left(\frac{PMMHG}{PATM}\right)^{\frac{2}{k}} - \left(\frac{PMMHG}{PATM}\right)^{\frac{k+1}{k}} \right\}} \quad (4)$$

where, AA: throttle opening area

R: gas constant

THA: intake air temperature

PATM: atmospheric pressure k: ratio of specific heat

PMMHG: intake pipe pressure estimated value

Figure 6:
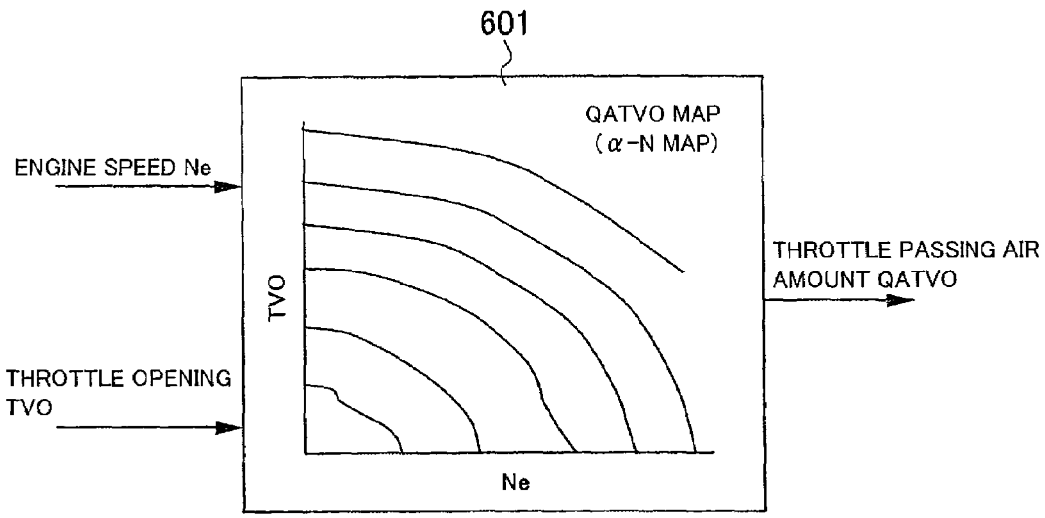
FIG. 6 is a block diagram showing one embodiment of a throttle passing air amount computing section used in the air amount computing unit of the internal combustion engine of the invention.

Therefore, the throttle passing air flow rate QATVO is found not by Equation (4) but by retrieving a map by throttle passing air amount map retrieving means 601 using a data map (α-N map) wherein the engine speed Ne and the throttle opening angle TVO are used as variables as shown in FIG. 6.

That is, the throttle passing air amount QATVO is found by retrieving the map by using the throttle passing air amount map retrieving means 601 as throttle passing air amount computing means from the engine speed Ne calculated by the engine speed calculating means 101 and the throttle opening angle TVO measured by the throttle opening sensor 215.

Figure 7:
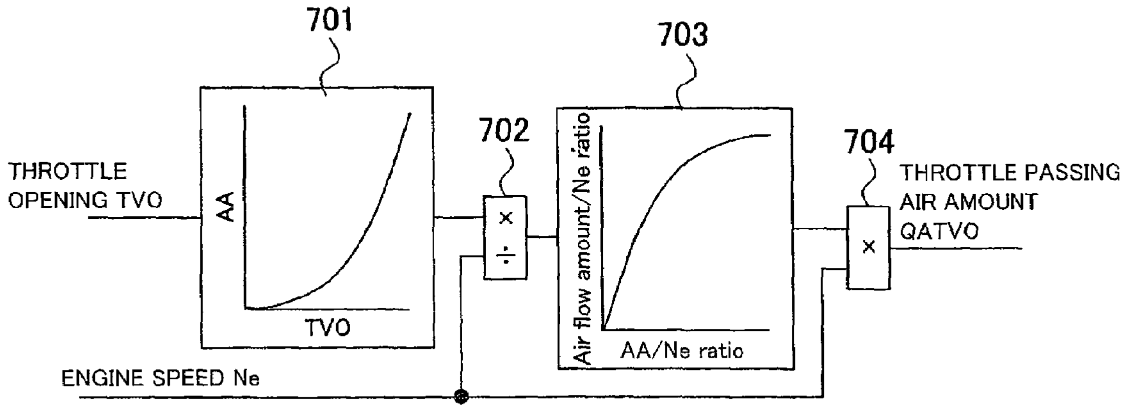
FIG. 7 is a block diagram showing another embodiment of the throttle passing air amount computing section used in the air amount computing unit of the internal combustion engine of the invention.

FIG. 7 shows another embodiment of the throttle passing air amount computing means for finding the throttle passing air amount QATVO. According to this embodiment, throttle opening area map retrieving means 701 finds the throttle opening area AA from the throttle opening angle TVO by retrieving a table. A computing element 702 divides it by the engine speed Ne to normalize and to calculate an AA/Ne ratio.

Next, air flow rate/Ne ratio map retrieving means 703 retrieves an air flow rate/Ne ratio from the AA/Ne ratio from a table. Then, a computing element 704 multiplies the air flow rate/Ne ratio with the engine speed Ne to calculate the throttle passing air amount QATVO.

Figure 8:
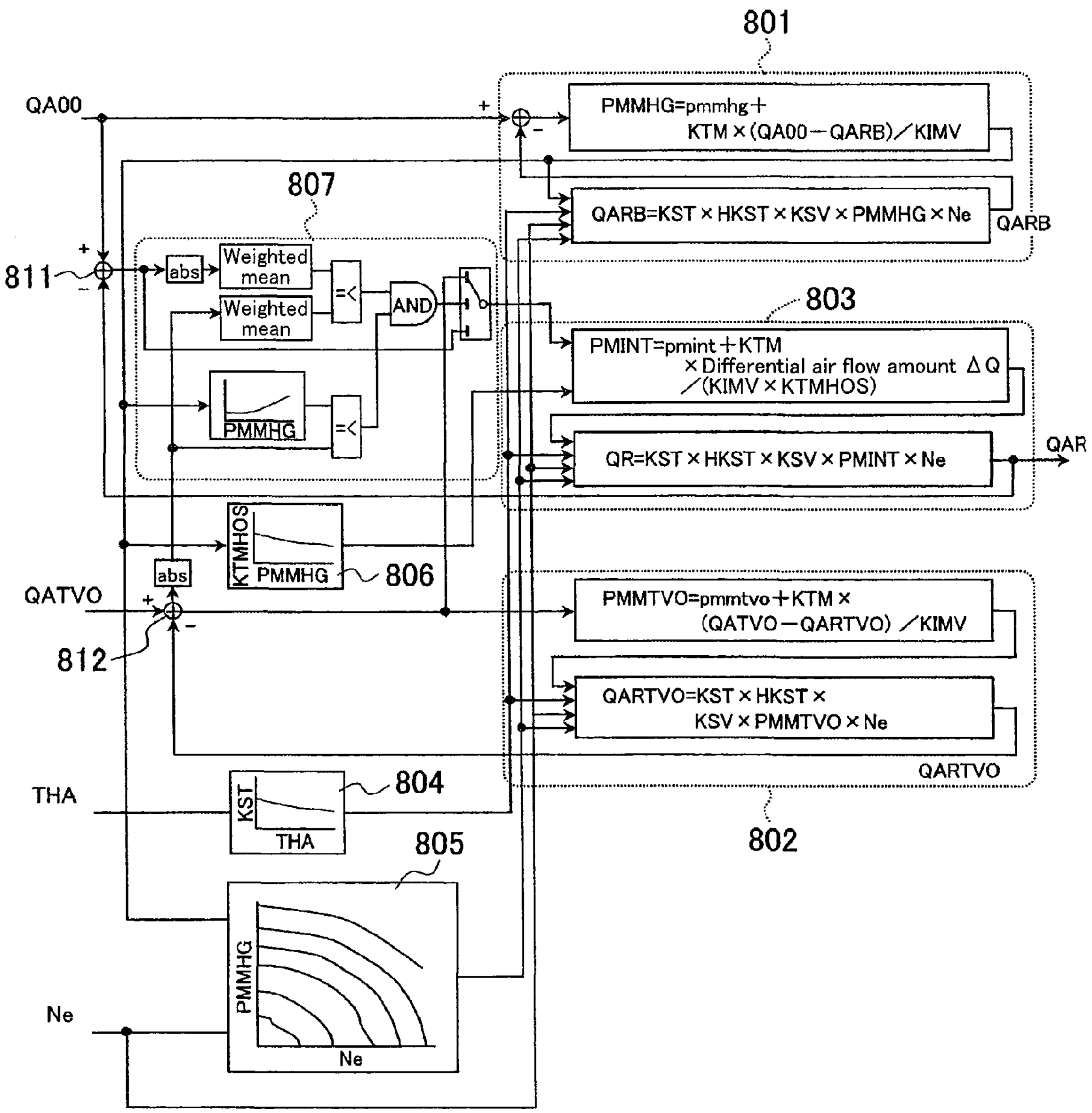
FIG. 8 is a block diagram showing a concrete structure of one embodiment of the air amount computing unit (cylinder flow-in air amount computing unit) of the internal combustion engine of the invention.

FIG. 8 shows a concrete structure of one embodiment of the air amount computing unit (cylinder flow-in air amount computing unit) of the internal combustion engine of the invention.

The cylinder flow-in air amount computing means of the present embodiment has first cylinder flow-in air amount computing means (first filter) 801, second cylinder flow-in air amount computing means (second filter) 802, third cylinder flow-in air amount computing means (third filter) 803, a first differential air flow rate computing element 811, a second differential air flow rate computing element 812, input switching judging means 807, intake air temperature correction factor computing means 804, estimated pressure error correction factor computing means 805 and pressure gradient correction factor computing means 806.

The first cylinder flow-in air amount computing means 801 calculates the cylinder flow-in air amount QARB by the following equations (5) and (6) by using the output of the H/W sensor 201 (H/W sensor measured air flow rate QA00):

[Equations 5 and 6]

$$PMMHG = pmmhg + KTM(QA00 - QARB)/KIMV \quad (5)$$

$$QARB = KST \cdot HKST \cdot KSV \cdot PMMHG \cdot Ne \quad (6)$$

where, PMMHG: intake pipe pressure estimated value based on the output of the H/W sensor pmmhg: pressure of intake pipe estimated or calculated from the H/W sensor measured air flow rate KTM: pressure gradient constant QA00: H/W sensor measured air flow rate KIMV: capacity of intake manifold (capacity within intake pipe)

KST: intake air temperature correction factor

HKST: estimated pressure error correction factor

KSV: capacity of cylinder

Ne: engine speed

The second cylinder flow-in air amount computing means 802 calculates the cylinder flow-in air amount QARTVO by the following equations (7) and (8) by using the throttle passing air flow rate QATVO. The cylinder flow-in air amount QARTVO is called as an α-N air amount.

[Equations 7 and 8]

$$PMMTVO = pmmtvo + KTM(QATVO - QATVO - QARTVO)/KIMV \quad (7)$$

$$QARTVO = KST \cdot HKST \cdot KSV \cdot PMMTVO \cdot Ne \quad (8)$$

where, PMMTVO: intake pipe pressure estimated value based on the α-N air amount pmmtvo: pressure of intake pipe estimated or calculated from the α-N air flow rate KTM: pressure gradient constant QA00: H/W sensor measured air flow rate KIMV: capacity of intake manifold (capacity within intake pipe)

KST: intake air temperature correction factor

HKST: estimated pressure error correction factor

Ne: engine speed

The first differential air flow rate computing means 811 calculates a differential air flow rate ΔQ by subtracting the cylinder flow-in air amount QAR (previous output value) calculated by the third cylinder flow-in air amount computing means 803 from the output of the H/W sensor 201 (H/W sensor measured air flow rate QA00).

The second differential air flow rate computing means 812 calculates a differential air flow rate ΔQ by subtracting the cylinder flow-in air amount QARTVO (previous output value) calculated by the second cylinder flow-in air amount computing means 802 from the throttle passing air flow rate QATVO.

The third cylinder flow-in air amount computing means 803 calculates the cylinder flow-in air amount QAR in accordance to the following equations (9) and (10) by switching the inputs of the first and second cylinder flow-in air amount computing means 801 and 802 corresponding to a condition, i.e., by the differential air flow rate selected by the input switching judging means 807 (selected from the differential air flow rate ΔQ calculated by the first differential air flow rate computing means 811 and the differential air flow rate ΔQ calculated by the second cylinder flow-in air amount computing means 802). The cylinder flow-in air amount QAR is used as an intake air amount in the computation of the basic fuel amount in the fuel control.

[Equations 9 and 10]

$$PMINT=pmint+KTM\cdot\text{differential air flow rate }\Delta Q/(KIMV\cdot KTMHOS) \quad (9)$$

$$QAR=KST\cdot HKST\cdot KSV\cdot PMINT\cdot Ne \quad (10)$$

where, PMINT: intake pipe pressure estimated value pmint: intake pipe pressure estimated or calculated on the basis of the air flow rate measured by the H/W sensor during the regular time or of the α-N air flow rate during transient time KTM: pressure gradient constant KIMV: capacity of intake manifold (capacity within intake pipe KTMHOS: pressure gradient correction factor KST: intake air temperature correction factor HKST: estimated pressure error correction factor KSV: capacity of cylinder Ne: engine speed The intake air temperature correction factor computing means 804 finds the intake air temperature correction factor KST from the intake air temperature THA by retrieving a table.

The estimated pressure error correction factor computing means (estimated pressure error correcting means) 805 finds the estimated pressure error correction factor HKST for correcting an error between the intake pipe pressure and the computed intake pipe estimated pressure (intake pipe pressure estimated value) in each driving range (engine speed Ne) by retrieving a map.

Corrections of the intake air temperature and estimated pressure error by the intake air temperature correction factor KST and the estimated pressure error correction factor HKST are carried out respectively by internal computations of the first through third cylinder flow-in air amount computing means 801, 802 and 803.

The pressure gradient correction factor computing means 806 retrieves the pressure gradient correction factor KTMHOS from the intake pipe pressure estimated value PMMHG from a table. The correction of the pressure gradient by the pressure gradient correction factor KTMHOS is carried out by internal computation of the third cylinder flow-in air amount computing means 803.

The input switching judging means 807 is what switches the input of the differential air flow rate ΔQ to the third cylinder flow-in air amount computing means 803 on the basis of the judged value and switches and selects a variable (differential air flow rate ΔQ) for finding the intake pipe pressure estimated value PMINT by the third cylinder flow-in air amount computing means 803 either from (QA00−QAR) calculated by the first differential air flow rate computing means 811 or from (QATVO−QARTVO) calculated by the second differential air flow rate computing means 812.

Specifically, when an absolute value of (QATVO−QARTVO) is greater than a predetermined threshold value and a weighted mean value of the absolute value of (QATVO−QARTVO) is greater than a weighted mean value of an absolute value of (QA00−QAR), it is judged to be a transient time and (QATVO−QARTVO) on the base of the α-N air flow rate is inputted to the third cylinder flow-in air amount computing means 803 as the differential air flow rate ΔQ. In another case, it is judged to be a static state and (QA00−QAR) on the base of the H/W sensor output is inputted to the third cylinder flow-in air amount computing means 803 as the differential air flow rate ΔQ.

Although the threshold value of (QATVO−QARTVO) may be a fixed value, it may be variably set to a value corresponding to the intake pipe pressure estimated value PMMHG obtained from the H/W sensor output.

Thereby, the computation of the intake pipe pressure estimated value is carried out not on the base of the H/W sensor output but on the base of the α-N air amount when the transient state is sharp like an acceleration time and others.

Thereby, the intake pipe pressure estimated value at the transient rise time will not delay from an actual intake pipe pressure. Corresponding to that, the cylinder flow-in air amount during the transient time will be calculated without response delay and so as not to have any inflection point in the changes of flow rate. Thus, the air-fuel ratio will not fluctuate during the transient time.

Then, during the regular time, the cylinder flow-in air amount may be computed on the base of the H/W output without being influenced by an error of the α-N air amount that is caused by an attachment error of the throttle opening sensor 215.

Figure 9:
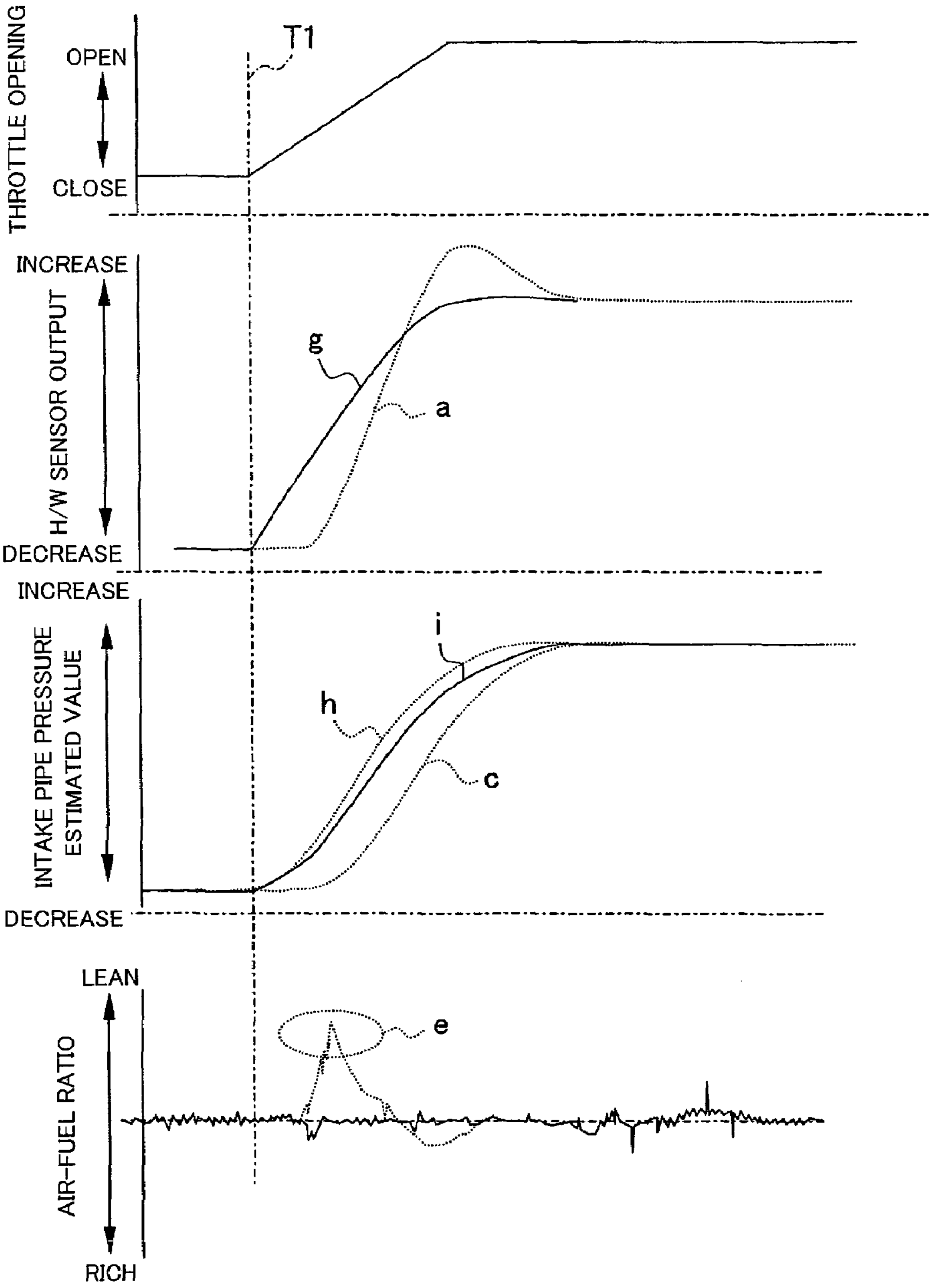
FIG. 9 is a time chart showing one exemplary fluctuating behavior of throttle opening angle, H/W sensor output, intake pipe pressure estimated value and exhaust air-fuel ratio of the present embodiment.

FIG. 9 is a time chart showing one exemplary fluctuating behavior of the throttle opening angle, H/W sensor output, intake pipe pressure estimated value and exhaust air-fuel ratio of the present embodiment. The throttle opening angle TVO increases and is put into an acceleration state from time T1. Although a rise of an output Shw of the H/W sensor 201 is late as indicated by a line a, a rise of the cylinder flow-in air amount indicated by a line g is not late because the α-N air flow rate is used in an initial period of the transient. A line h is the intake pipe pressure estimated value PMMTVO calculated from the α-N air flow rate and a line c is the intake pipe pressure estimated value PMMHG calculated from the H/W sensor output.

The intake pipe pressure estimated value PMINT is indicated by a line i and shows a behavior of tracing an intermediate part between the line h and the line c in the present embodiment. As a result, the lean area e that has been generated in the control of the basic part is eliminated and the air-fuel ratio becomes flat even during the transient time.

Figure 10:
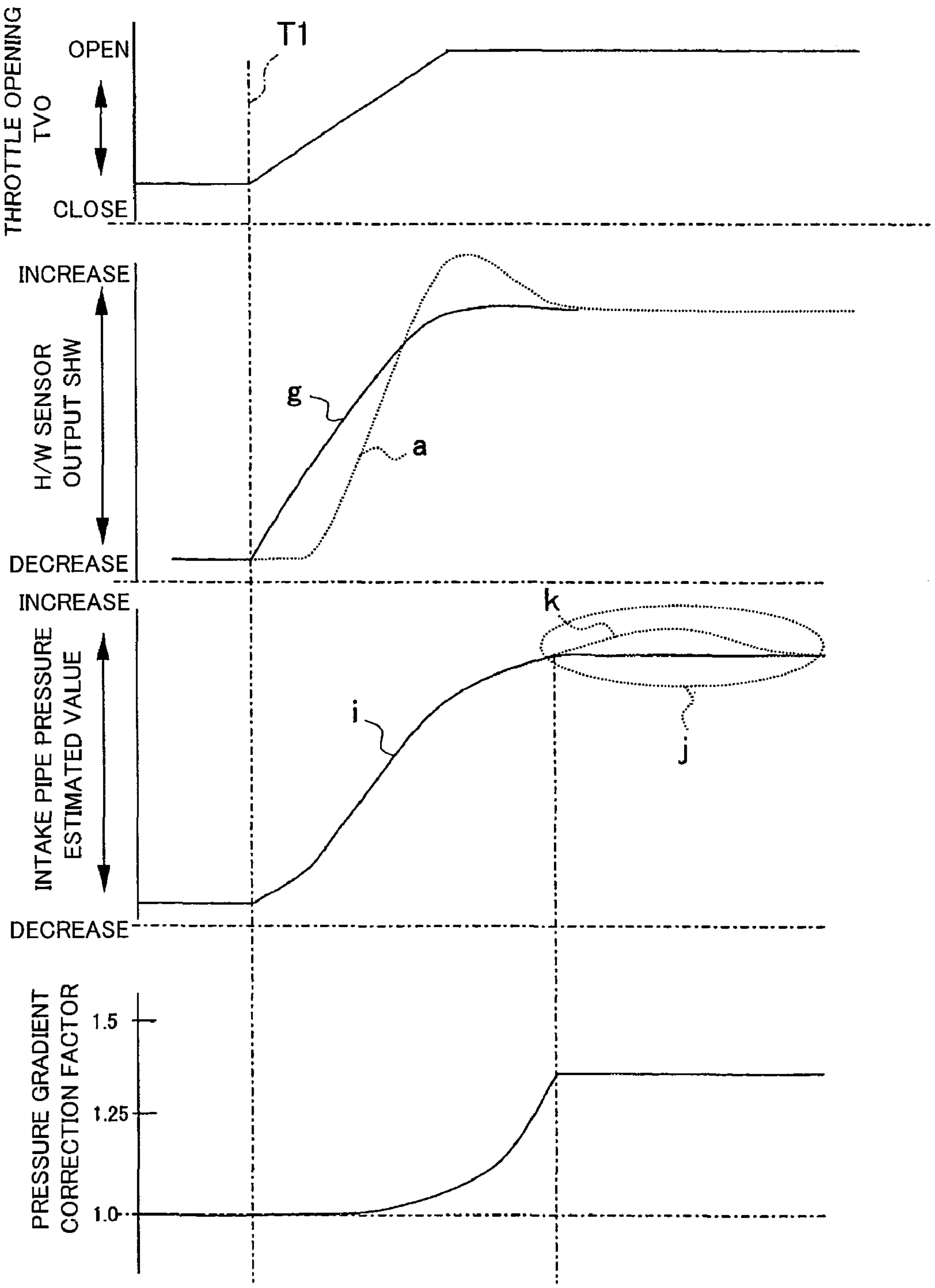
FIG. 10 is a time chart showing one exemplary fluctuating behavior of throttle opening angle, H/W sensor output, intake pipe pressure estimated value and pressure gradient correction factor of the present embodiment.

FIG. 10 is a time chart showing one exemplary fluctuating behavior of the throttle opening angle, H/W sensor output, intake pipe pressure estimated value and pressure gradient correction factor KTMHOS of the present embodiment.

Although there is a case when the intake pipe estimated pressure causes an overshoot k on the side where the intake pipe pressure is close to the atmospheric pressure as indicated by an area j when there is no pressure gradient correction factor KTMHOS, the overshoot k is eliminated by retrieving the correction factor KTMHOS for the pressure gradient corresponding to the intake pipe pressure (intake pipe estimated pressure) and by making correction like the present embodiment.

Figure 11:
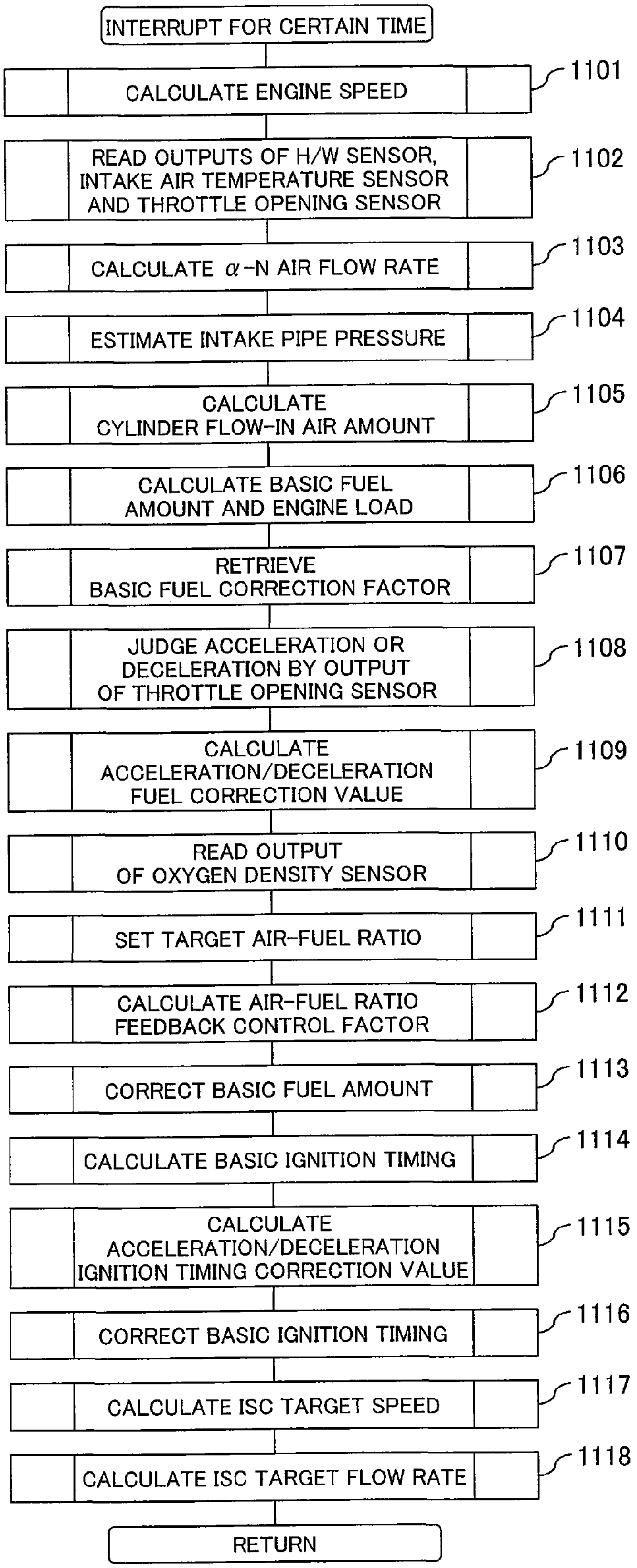
FIG. 11 is a flowchart showing a control flow of the engine to which the air amount computing unit of the invention is applied.

FIG. 11 is a flowchart showing a control flow of the engine to which the air amount computing unit of the invention is applied.

At first, the control unit 300 processes the electrical signal of the crank angle sensor 207 to calculate the engine speed in Step 1101. Next, it reads outputs of the H/W sensor 201, the intake air temperature sensor 205 and the throttle opening sensor 215 in Step 1102.

Next, the control unit 300 calculates an α-N air flow rate (QATVO) in Step 1103.

Then, the control unit 300 calculates an estimated value of intake pipe pressure in Step 1104 and calculates a cylinder flow-in air amount in Step 1105.

Next, the control unit calculates a basic fuel amount and an engine load in Step 1106. Next, it retrieves a basic fuel correction factor by a map in Step 1107. It judges acceleration or deceleration by an output of the throttle sensor in Step 1108 and calculates an acceleration/deceleration fuel correction amount in Step 1109.

Next, the control unit reads an output of the oxygen density sensor 210 in Step 1110. Then, it sets a target air-fuel ratio in Step 1111 and calculates an air-fuel ratio feedback control factor so as to be able to realize the target air-fuel ratio in Step 1112.

Next, the control unit corrects the basic fuel amount by the basic fuel correction factor, the air-fuel ratio feedback control factor and others in Step 1113.

Next, the control unit retrieves basic ignition timing by a map in Step 1114. Next, it calculates an acceleration/deceleration ignition timing correction value in Step 1115 and corrects the basic ignition timing in Step 1116.

Next, the control unit sets an ISC target speed in Step 1117 and calculates an ISC target flow rate to control the ISC valve in Step 1118.

Figure 12:
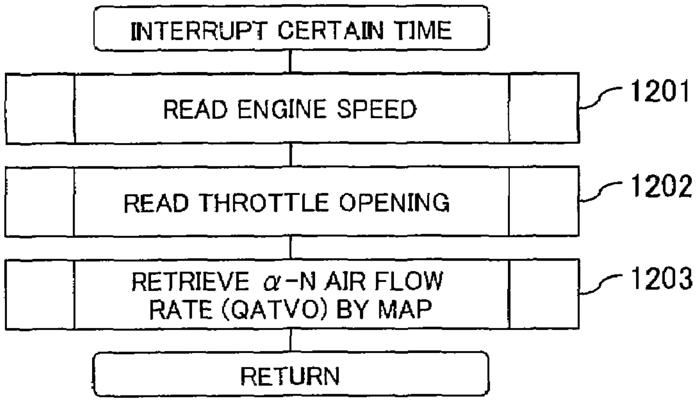
FIG. 12 is a flowchart showing one exemplary processing flow for finding a α-N air amount by the throttle passing air amount computing section shown in FIG. 6.

FIG. 12 is a flowchart showing one exemplary processing flow for finding a α-N air flow rate by the throttle passing air amount computing section shown in FIG. 6.

The throttle passing air amount computing section reads the engine speed Ne at first in Step 1201 and reads the throttle opening angle in Step 1202.

Next, the computing section retrieves the α-N air flow rate from the aforementioned engine speed Ne and the throttle opening angle from a map.

Figure 13:
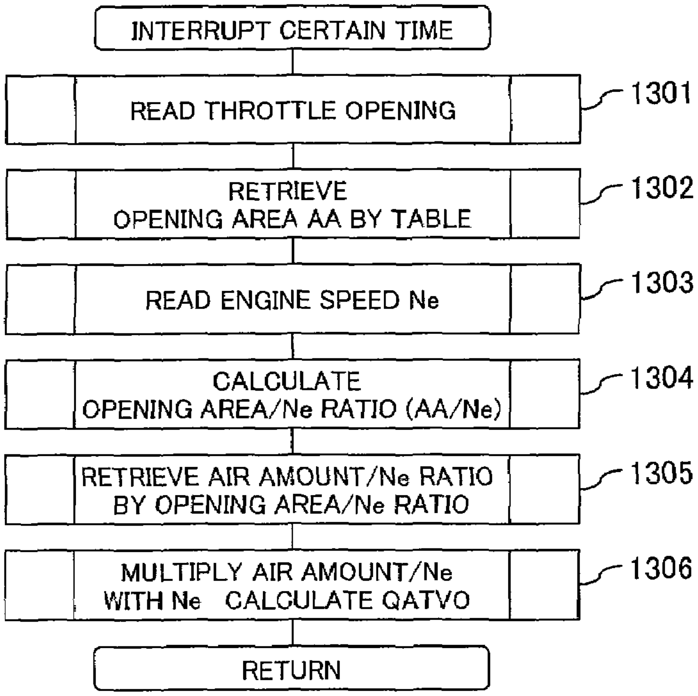
FIG. 13 is a flowchart showing one exemplary processing flow for finding the α-N air amount by the throttle passing air amount computing section shown in FIG. 7.

FIG. 13 is a flowchart showing one exemplary processing flow for finding the α-N air flow rate by the throttle passing air amount computing section shown in FIG. 7.

At first, the throttle passing air amount computing section reads the throttle opening angle in Step 1301 and retrieves an opening area AA from a table by the throttle opening angle in Step 1302.

Next, the throttle passing air amount computing section reads the engine speed Ne in Step 1303 and calculates an AA/Ne ratio by dividing the opening area AA by the engine speed Ne in Step 1304.

Next, it retrieves an air flow rate/Ne ratio from the AA/Ne ratio from a table in Step 1305 and calculates the α-N air flow rate QATVO by multiplying the air flow rate/Ne with Ne in Step 1306.

Figure 14:
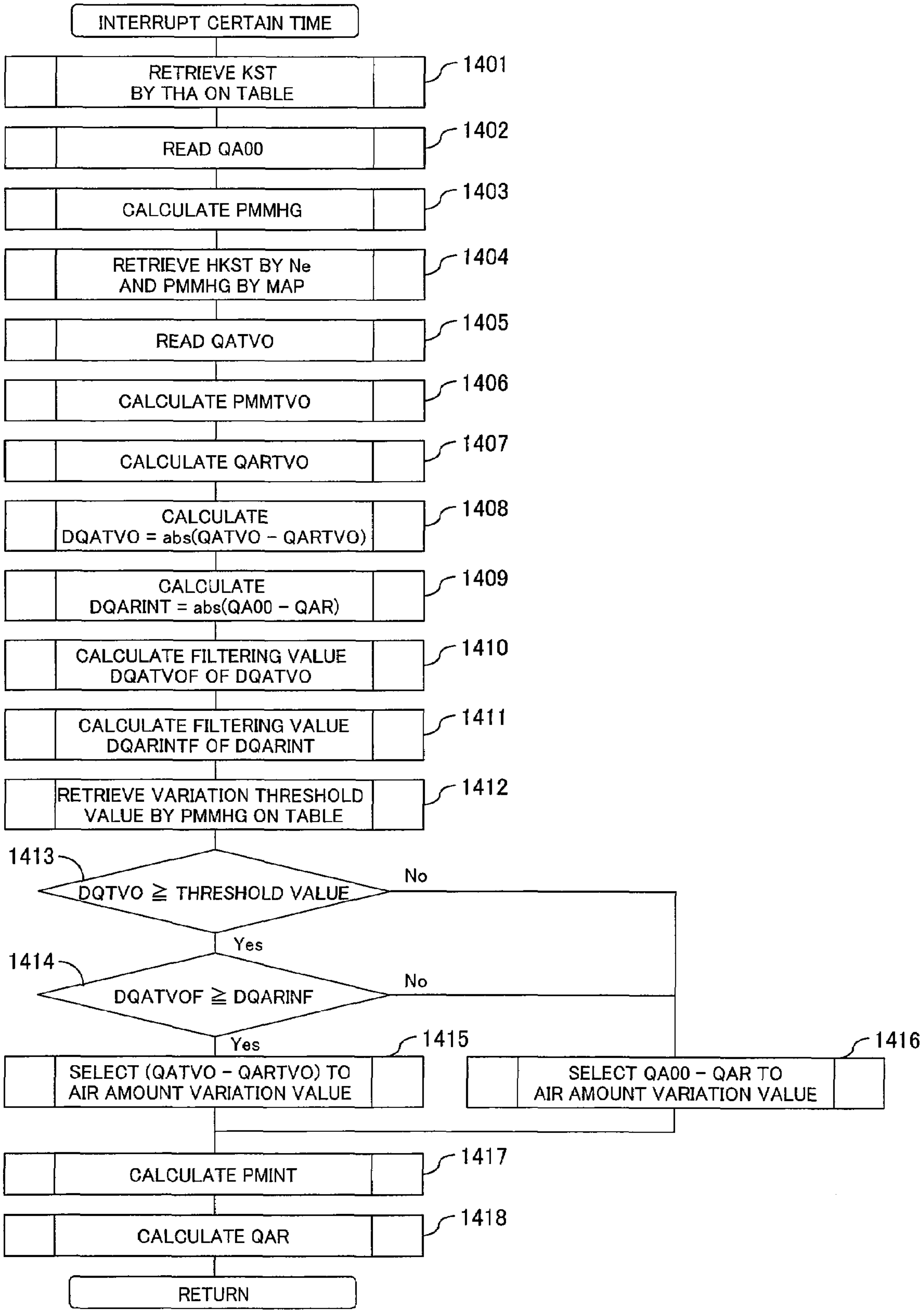
FIG. 14 is a flowchart showing one exemplary processing flow of the air amount computing unit of the internal combustion engine of the invention.

FIG. 14 is a flowchart showing one exemplary processing flow for finding the cylinder flow-in air amount.

At first, the air amount computing unit retrieves the intake air temperature KST from the intake air temperature THA from a table in Step 1401.

Next, it reads the intake air amount QA00 of the H/W sensor 201 in Step 1402 and calculates the intake pipe pressure estimated value PMMHG of the QA00 base in Step 1403.

Next, the air amount computing unit retrieves an estimated pressure error correction factor HKST from the engine speed Ne and the intake pipe pressure estimated value PMMHG from a map in Step 1404.

Next, it reads the throttle passing air amount (α-N air flow rate) QATVO in Step 1405 and calculates the intake pipe pressure estimated value PMMTVO on the α-N air amount base in Step 1406.

Next, the air amount computing unit calculates the cylinder flow-in air amount QARTVO on the PMMTVO base in Step 1407.

Next, the air amount computing unit calculates an absolute value DQATVO of a difference between the α-N air flow rate QATVO and the cylinder flow-in air amount QARTVO on the QATVO base in Step 1408. It corresponds to the absolute value of the differential air flow rate ΔQ calculated by the second differential air flow rate computing element 812.

Next, the air amount computing unit calculates an absolute value DQARINT of a difference between the absolute value QA00 of the difference and the already calculated cylinder flow-in air amount (cylinder flow-in air amount that is the final output of this control) QAR in Step 1409. It corresponds to an absolute value of the differential air flow rate ΔQ calculated by the first differential air flow rate computing element 811.

Next, the air amount computing unit calculates a filtering value DQATVOF of the absolute value DQATVO of the difference in Step 1410 and calculates a filtering value DQARINTF of an absolute value DQARINT of the other difference.

Next, the air amount computing unit retrieves an intake air amount variation threshold value from the intake pipe pressure estimated value PMMHG on the QA00 base from a table in Step 1412.

Next, the air amount computing unit judges whether or not the absolute value DQTVO of the difference is greater than the intake air amount variation threshold value and whether or not the filtering value DQATVOF of DQATV is greater than the filtering value DQARINF of DQARINT in Steps 1413 and 1414.

If this judgment is true, the air amount computing unit inputs (QATVO−QARTVO) to a term of variation of air amount (differential air flow rate) in the computation for estimating the pressure in Step 1415. If this judgment is false in contrary, the air amount computing unit inputs (QA00−QAR) to the term of variation of air amount (differential air flow rate) in the computation for estimating the pressure in Step 1416.

After that, the air amount computing unit calculates the intake pipe pressure estimated value PMINT in Step 1417 and calculates the final cylinder flow-in air amount QAR used in the computation of basic fuel amount in Step 1418.

Thereby, the cylinder flow-in air amount on the base of the H/W sensor output is computed during the regular time and the cylinder flow-in air amount on the base of the α-N air flow rate is computed during the transient time. Then, output behaviors of the respective cylinder flow-in air amounts become analogous due to a filtering property of the filters, their outputs link smoothly without having any inflection point and no fluctuation occurs in the air-fuel ratio even when the transient and static states are switched.

What is claimed is:

1. An air amount computing unit of an internal combustion engine, comprising:

air amount detecting means for detecting an air amount passing through an intake throttle section of the internal combustion engine;

air amount computing means for obtaining a calculated value of the air amount passing through the intake throttle section from a throttle opening;

means for obtaining an air amount flowing into a cylinder of the internal combustion engine by excluding an air amount filled into an intake manifold by filtering by a difference between a value of the air amount passing through the intake throttle section of this time and a previous filtering value;

a first filter based on the air amount detected by the air amount detecting means;

a second filter based on the calculated value of the air amount obtained by the air amount computing means;

selecting means for selecting an input value and a previous output value of the first filter when the internal combustion engine is in a static state and selecting an input value and a previous output value of the second filter when the internal combustion engine is in a transient state; and a third filter for inputting a selected value selected by said selecting means; wherein the output of the third filter is determined to be the air amount flowing into the cylinder.

2. The air mount computing unit of the internal combustion engine according to claim 1, wherein each filter has a calculated intake pipe pressure estimated value as an internal state variable and outputs the cylinder flow-in air amount corresponding to the pressure estimated value as an output of each filter.

3. The air amount computing unit of the internal combustion engine according to claim 1, wherein the judgment whether the internal combustion engine is in the static state or in the transient state is made by comparing a differential value between the throttle passing air amount of this time measured by the air amount detecting means and the previous filtering value with a differential value of the calculated value of the throttle passing air amount and the previous filtering value.

4. An air amount computing unit of an internal combustion engine, comprising:

air amount detecting means for detecting an air amount passing though an intake throttle section of the internal combustion engine;

throttle passing air amount computing means for calculating an air amount passing through the intake throttle from a throttle opening;

driving state judging means for judging whether the internal combustion engine is in the transient state or in the static state; and cylinder flow-in air amount computing means for computing an air amount flowing into a cylinder by using the air amount measured by the air amount detecting means when the driving state judging means judges that the internal combustion engine is in the static state and for computing the air amount flowing into the cylinder by using the air amount calculated by the throttle passing air amount computing means when the driving state judging means judges that the internal combustion engine is in the transient state.

5. The air amount computing unit of the internal combustion engine according to claim 4, wherein the cylinder flow-in air amount computing means computes the air amount flowing into the cylinder from the intake pipe pressure estimated value that is computed from a differential air flow rate obtained from the air amount taken into the intake pipe and the air mount going out of the intake pipe and uses the difference between the air amount measured by the air amount detecting means and the cylinder flow-in air amount computed by the cylinder flow-in air amount computing means as the differential air flow rate when the internal combustion engine is in the static state and uses the difference between the air amount calculated by the throttle passing air mount computing means and the cylinder flow-in air amount computed based on the air amount as the differential air flow rate when the internal combustion engine is in the transient state.

6. The air amount computing unit of the internal combustion engine according to claim 5, further comprising estimated pressure error correcting means for correcting an error between the intake pipe pressure in the driving range (engine speed Ne) and the computed intake pipe pressure estimated value.

7. The air amount computing unit of the internal combustion engine according to claim 1, wherein the air amount detecting means is a thermal air flow meter.

8. The air amount computing unit of the internal combustion engine according to claim 1, wherein the air amount computing means retrieves the throttle passing air amount from a map defined by the engine speed and the throttle opening.

9. The air amount computing unit of the internal combustion engine according to claim 1, wherein the air amount computing means theoretically computes the throttle passing air amount from a throttle opening area, differential pressure before and after the throttle and intake air temperature.

10. The air amount computing unit of the internal combustion engine according to claim 1, wherein the air amount computing means normalizes the throttle opening area by the engine speed and calculates the throttle passing air amount by finding an air flow rate per engine speed from the normalized value.

11. The air amount computing unit of the internal combustion engine according to claim 1, wherein the driving state judging means judges that the internal combustion engine is in the transient time when an absolute value of the difference between the air amount calculated by the throttle passing air amount computing means and the cylinder flow-in air amount computed on the basis of the air amount is greater than a predetermined threshold value and when the absolute value of the difference between the air amount calculated by the throttle passing air amount computing means and the cylinder flow-in air amount computed on the basis of the air amount is greater than an absolute value of the difference between the air mount measured by the air amount detecting means and the cylinder flow-in air amount computed by the cylinder flow-in air amount computing means and judges that the internal combustion engine is in the static state in the other case.

12. A fuel control unit of the internal combustion engine for controlling a fuel injection amount by using the cylinder flow-in air amount computed by the air amount computing unit of the internal combustion engine comprising:

air amount detecting means for detecting an air amount passing through an intake throttle section of the internal combustion engine;

air amount computing means for obtaining a calculated value of the air amount passing through the intake throttle section from a throttle opening;

means for obtaining an air amount flowing into a cylinder of the internal combustion engine by excluding an air amount filled into an intake manifold by filtering by a difference between a value of the air amount passing through the intake throttle section of this time and a previous filtering value;

a first filter based on the air amount detected by the air amount detecting means;

a second filter based on the calculated value of the air amount obtained by the air amount computing means;

selecting means for selecting an input value and a previous output value of the first filter when the internal combustion engine is in a static state and selecting an input value and a previous output value of the second filter when the internal combustion engine is in a transient state; and a third filter for inputting a selected value selected by said selecting means; wherein the output of the third filter is determined to be the air amount flowing into the cylinder.

* * * * *